United States Patent
Burger et al.

(10) Patent No.: US 9,940,136 B2
(45) Date of Patent: Apr. 10, 2018

(54) REUSE OF DECODED INSTRUCTIONS

(71) Applicant: Microsoft Technology Licensing, LLC, Redmond, WA (US)

(72) Inventors: Douglas Christopher Burger, Bellevue, WA (US); Aaron Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 14/752,596

(22) Filed: Jun. 26, 2015

(65) Prior Publication Data

US 2016/0378483 A1 Dec. 29, 2016

(51) Int. Cl.
| | |
|---|---|
| G06F 9/44 | (2006.01) |
| G06F 9/50 | (2006.01) |
| G06F 9/45 | (2006.01) |
| G06F 9/30 | (2018.01) |
| G06F 9/38 | (2018.01) |

(52) U.S. Cl.
CPC .......... *G06F 9/30181* (2013.01); *G06F 9/381* (2013.01); *G06F 9/382* (2013.01); *G06F 9/3836* (2013.01); *G06F 9/3891* (2013.01); G06F 8/443 (2013.01); G06F 8/445 (2013.01);
(Continued)

(58) Field of Classification Search
CPC .... G06F 9/30181; G06F 9/381; G06F 9/3812; G06F 9/3814; G06F 9/382; G06F 9/3836; G06F 9/3891; G06F 9/5061; G06F 9/5066; G06F 9/4881; G06F 9/30065;
(Continued)

(56) References Cited

U.S. PATENT DOCUMENTS

| | | |
|---|---|---|
| 5,615,350 A | 3/1997 | Hesson |
| 5,790,822 A | 8/1998 | Sheaffer et al. |

(Continued)

FOREIGN PATENT DOCUMENTS

| | | |
|---|---|---|
| CN | 101344843 | 1/2009 |
| CN | 102306094 | 1/2012 |

(Continued)

OTHER PUBLICATIONS

Bouwens et al., "Architecture Enhancements for the ADRES Coarse-Grained Reconfigurable Array," High Performance Embedded Architectures and Compilers, Springer Berlin Heidelberg pp. 66-81 (2008).

(Continued)

*Primary Examiner* — Daniel H Pan
(74) *Attorney, Agent, or Firm* — Klarquist Sparkman, LLP

(57) ABSTRACT

Systems and methods are disclosed for reusing fetched and decoded instructions in block-based processor architectures. In one example of the disclosed technology, a system includes a plurality of block-based processor cores and an instruction scheduler. A respective core is capable of executing one or more instruction blocks of a program. The instruction scheduler can be configured to identify a given instruction block of the program that is resident on a first processor core of the processor cores and is to be executed again. The instruction scheduler can be configured to adjust a mapping of instruction blocks in flight so that the given instruction block is re-executed on the first processor core without re-fetching the given instruction block.

22 Claims, 11 Drawing Sheets

(52) U.S. Cl.
CPC .......... *G06F 8/452* (2013.01); *G06F 9/30065* (2013.01); *G06F 9/5061* (2013.01); *G06F 9/5066* (2013.01)

(58) Field of Classification Search
CPC ........ G06F 8/4452; G06F 8/445; G06F 8/452; G06F 8/443
USPC ................. 712/205, 207, 241–245; 718/103; 717/150, 159, 160
See application file for complete search history.

(56) References Cited

U.S. PATENT DOCUMENTS

| | | | |
|---|---|---|---|
| 5,796,997 | A | 8/1998 | Lesartre et al. |
| 5,845,103 | A | 12/1998 | Sodani et al. |
| 5,943,501 | A | 8/1999 | Burger et al. |
| 6,016,399 | A | 1/2000 | Chang |
| 6,044,222 | A | 3/2000 | Simons et al. |
| 6,061,776 | A | 5/2000 | Burger et al. |
| 6,161,170 | A | 12/2000 | Burger et al. |
| 6,164,841 | A | 12/2000 | Mattson et al. |
| 6,279,101 | B1 | 8/2001 | Witt et al. |
| 6,493,820 | B2 | 12/2002 | Akkary et al. |
| 6,513,109 | B1 | 1/2003 | Gschwind et al. |
| 6,529,922 | B1 | 3/2003 | Hoge |
| 6,732,260 | B1 | 5/2004 | Wang et al. |
| 6,851,043 | B1 | 2/2005 | Inoue |
| 6,918,032 | B1 | 7/2005 | Abdallah et al. |
| 6,965,969 | B2 | 11/2005 | Burger et al. |
| 6,988,183 | B1 | 1/2006 | Wong |
| 7,032,217 | B2 | 4/2006 | Wu |
| 7,210,127 | B1 | 4/2007 | Rangachari |
| 7,299,458 | B2 | 11/2007 | Hammes |
| 7,380,038 | B2 | 5/2008 | Gray |
| 7,676,650 | B2 | 3/2010 | Ukai |
| 7,853,777 | B2 | 12/2010 | Jones et al. |
| 7,877,580 | B2 | 1/2011 | Eickemeyer et al. |
| 7,917,733 | B2 | 3/2011 | Kazuma |
| 7,958,396 | B2 | 6/2011 | Chitsaz et al. |
| 8,055,881 | B2 | 11/2011 | Burger et al. |
| 8,055,885 | B2 | 11/2011 | Nakashima |
| 8,127,119 | B2 | 2/2012 | Burger et al. |
| 8,180,997 | B2 | 5/2012 | Burger et al. |
| 8,201,024 | B2 | 6/2012 | Burger et al. |
| 8,250,555 | B1 | 8/2012 | Lee et al. |
| 8,321,850 | B2 | 11/2012 | Bruening et al. |
| 8,433,885 | B2 | 4/2013 | Burger et al. |
| 8,447,911 | B2 | 5/2013 | Burger et al. |
| 8,464,002 | B2 | 6/2013 | Burger et al. |
| 8,464,271 | B2 | 6/2013 | Eichenberger et al. |
| 8,510,596 | B1 | 8/2013 | Gupta et al. |
| 8,612,726 | B2 | 12/2013 | Sharawi et al. |
| 8,817,793 | B2 | 8/2014 | Mushano |
| 9,021,241 | B2 | 4/2015 | Burger et al. |
| 9,043,769 | B2 | 5/2015 | Vorbach |
| 9,053,292 | B2 | 6/2015 | Abdallah |
| 2003/0101208 | A1* | 5/2003 | Chauvel ................ G06F 8/4434 718/1 |
| 2005/0076194 | A1* | 4/2005 | Kanapathippillai .. G06F 1/3203 712/241 |
| 2006/0041875 | A1 | 2/2006 | Peri et al. |
| 2006/0242391 | A1 | 10/2006 | Elwood |
| 2007/0050557 | A1 | 3/2007 | Ferren et al. |
| 2007/0157006 | A1 | 7/2007 | Jourdan et al. |
| 2007/0192540 | A1* | 8/2007 | Gara ..................... G06F 9/3828 711/117 |
| 2007/0255980 | A1 | 11/2007 | Endo et al. |
| 2008/0109668 | A1 | 5/2008 | Atkinson |
| 2008/0235499 | A1 | 9/2008 | Togawa |
| 2009/0013135 | A1 | 1/2009 | Burger et al. |
| 2009/0013160 | A1 | 1/2009 | Burger et al. |
| 2009/0138681 | A1 | 5/2009 | Saha |
| 2009/0150657 | A1 | 6/2009 | Gschwind et al. |
| 2010/0146209 | A1 | 6/2010 | Burger et al. |
| 2010/0325395 | A1 | 12/2010 | Burger et al. |
| 2011/0060889 | A1 | 3/2011 | Burger et al. |
| 2011/0072239 | A1 | 3/2011 | Burger et al. |
| 2011/0078424 | A1 | 3/2011 | Boehm et al. |
| 2011/0219222 | A1 | 9/2011 | Eichenberger et al. |
| 2011/0238953 | A1 | 9/2011 | Metsugi et al. |
| 2012/0017069 | A1 | 1/2012 | Bourd et al. |
| 2012/0079102 | A1* | 3/2012 | Damodaran ....... H03K 19/0016 709/224 |
| 2012/0079488 | A1 | 3/2012 | Phillips et al. |
| 2012/0124345 | A1 | 5/2012 | Denman et al. |
| 2012/0204004 | A1 | 8/2012 | Dockser et al. |
| 2012/0303933 | A1 | 11/2012 | Manet et al. |
| 2012/0311306 | A1 | 12/2012 | Mushano |
| 2013/0024676 | A1 | 1/2013 | Glew et al. |
| 2013/0086370 | A1 | 4/2013 | Burger et al. |
| 2013/0198499 | A1 | 8/2013 | Dice et al. |
| 2013/0246682 | A1 | 9/2013 | Jandhyam |
| 2014/0033217 | A1* | 1/2014 | Vajda ..................... G06F 9/528 718/102 |
| 2014/0075144 | A1 | 3/2014 | Sanders et al. |
| 2014/0082327 | A1 | 3/2014 | Ghose |
| 2014/0136822 | A1* | 5/2014 | Suggs ................ G06F 9/30065 712/241 |
| 2014/0181475 | A1 | 6/2014 | Abdallah |
| 2014/0189287 | A1 | 7/2014 | Plotnikov |
| 2014/0201507 | A1 | 7/2014 | Jayaseelan et al. |
| 2014/0281389 | A1 | 9/2014 | Loktyukhin et al. |
| 2014/0281402 | A1 | 9/2014 | Comparan et al. |
| 2014/0281424 | A1 | 9/2014 | Bobba et al. |
| 2014/0331236 | A1 | 11/2014 | Mitra et al. |
| 2014/0372736 | A1 | 12/2014 | Greenhalgh |
| 2015/0067662 | A1 | 3/2015 | Palalau |
| 2015/0095628 | A1 | 4/2015 | Yamada et al. |
| 2015/0100757 | A1 | 4/2015 | Burger et al. |
| 2015/0127928 | A1 | 5/2015 | Burger et al. |
| 2015/0199199 | A1 | 7/2015 | Burger et al. |
| 2016/0179546 | A1 | 6/2016 | Yamada et al. |
| 2016/0378479 | A1* | 12/2016 | Burger ..................... G06F 9/381 712/16 |
| 2016/0378484 | A1 | 12/2016 | Burger et al. |
| 2016/0378488 | A1 | 12/2016 | Burger et al. |
| 2016/0378491 | A1 | 12/2016 | Burger et al. |
| 2016/0378493 | A1 | 12/2016 | Burger et al. |
| 2016/0378496 | A1 | 12/2016 | Gray et al. |
| 2016/0378499 | A1 | 12/2016 | Burger et al. |
| 2016/0378661 | A1 | 12/2016 | Gray et al. |
| 2017/0083340 | A1 | 3/2017 | Burger et al. |
| 2017/0083343 | A1* | 3/2017 | Burger ................. G06F 9/3004 |

FOREIGN PATENT DOCUMENTS

| | | |
|---|---|---|
| EP | 0 992 894 A1 | 4/2000 |
| EP | 1 039 374 A2 | 9/2000 |
| WO | WO 2004/001587 A2 | 12/2003 |
| WO | WO 2009/006607 | 1/2009 |
| WO | WO 2011/03136 A1 | 3/2011 |
| WO | WO 2013/081556 A1 | 6/2013 |
| WO | WO 2013/095401 | 6/2013 |
| WO | WO 2014/193878 | 12/2014 |

OTHER PUBLICATIONS

Burger et al., "Scaling to the End of Silicon with EDGE Architectures," In Proceedings of Computer, vol. 37, Issue 7, Jul. 1, 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan et al., "Scalable Selective Re-Execution for EDGE Architectures," In Proceedings of the 11th International Conference on Architectural Support for Programming Languages and Operating Systems, Oct. 9, 2004, 13 pages.

Duric et al., "Dynamic-Vector Execution on a General Purpose EDGE Chip Multiprocessor," In Proceedings of the 2014 Interna-

(56) References Cited

OTHER PUBLICATIONS tional Conference on Embedded Computers Syhstems: Architectures, Modeling, and Simulation (SAMOS XIV), Jul. 14-17, 2014, 8 pages.
Duric et al., "EVX: Vector Execution on Low Power EDGE Cores," Design, Automation and Test in European Conference and Exhibition, Mar. 24-28, 2014, 4 pages.
Duric et al., "ReCompAc: Reconfigurable compute accelerator," IEEE 2013 International Conference on Reconfigurable Computing and FPGAS (Reconfig), Dec. 9, 2013, 4 pages.
Gebhart et al., "An Evaluation of the TRIPS Computer System," In Proceedings of the 14th international conference on Architectural support for programming languages and operating systems, Mar. 7, 2009, 12 pages.
Govindan et al., "Scaling Power and Performance via Processor Composability," IEEE Transaction on Computers, No. 1, Aug. 2014, 14 pages.
Govindaraju et al., "DySER: Unifying Functionality and Parallelism Specialization for Energy-Efficient Computing," IEEE Micro, IEEE Service Center, Sep. 1, 2012, 14 pages.
Gray and Smith, "Towards an Area-Efficient Implementation of a High ILP EDGE Soft Processor: Comparing Out-of-Order Dataflow Instruction Scheduler Designs," poster temporarily on display during the 22nd IEEE International Symposium on Field-Programmable Custom Computing Machines, May 11-13, 2014, Boston, Massachusetts (poster on display for approximately 1-2 hours, and less than one day, May 2014).
Gulati et al., "Multitasking Workload Scheduling on Flexible Core Chip Multiprocessors," In Proceedings of the Computer Architecture News, vol. 36, Issue 2, May 2008, 10 pages.
Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May 2000, 125 pages.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (Micro 2007), pp. 381-394, (2007)).
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Putnam et al., "Dynamic Vectorization in the E2 Dynamic Multicore Architecture," 6 pages (also published as Putnam, et al., "Dynamic vectorization in The E2 dynamic multicore architecture" ACM SIGARCH Computer Architecture News pp. 27-32. (2011)).
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous Trips Architecture," In Proceedings of the 30th Annual International Symposium on Computer Architecture, Jun. 9, 2003, 12 pages.
Sibi et al., "Scaling Power and Performance via Processor Composability," University of Texas at Austin technical report No. TR-10-14 (2010), 20 pages.
Smith et al., "Compiling for EDGE Architectures," In Proceedings of International Symposium on Code Generation and Optimization, Mar. 26, 2006, 11 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Tamches et al., "Dynamic Kernel Code Optimization," In Workshop on Binary Translation, 2001, 10 pages.
August, et al., "Architectural Support for Compiler-Synthesized Dynamic Branch Prediction Strategies: Rationale and Initial Results", In Proceedings of Third International Symposium on High-Performance Computer Architecture, Feb. 1, 1997, pp. 84-93.
Burger et al., "Design and Implementation of the TRIPS EDGE Architecture", In Proceedings of the 32nd Annual International Symposium on Computer Architecture, Jun. 4, 2005, pp. 1-41.
Bush et al., "Evaluation and Optimization of Signal Processing Kernels on the TRIPS Architecture", In Proceedings of 4th Annual Workshop on Optimizations for DSP and Embedded Systems, Mar. 2006, pp. 1-10.
Chiu et al., "Hyperscalar: A Novel Dynamically Reconfigurable Multi-core Architecture", In Proceedings of 39th International Conference on Parallel Processing, Sep. 13, 2010, pp. 277-286.
Duong, et al., "Compiler-Assisted, Selective Out-of-Order Commit", In Journal of IEEE Computer Architecture Letters, vol. 12, Issue 1, Jan. 2013, 3 pages.
"Explicit Data Graph Execution", Retrieved on: Aug. 6, 2015, Available at: https://en.wikipedia.org/wiki/Explicit_Data_Graph_Execution.
Fallin, et al., "The Heterogeneous Block Architecture", In Proceedings of 32nd IEEE International Conference on Computer Design, Oct. 19, 2014, pp. 1-8.
Gaudiot, et al., "The Sisal Model of Functional Programming and its Implementation", In Proceedings of Second Aizu International Symposium on Parallel Algorithms/Architectures Synthesis, Mar. 17, 1997, pp. 1-12.
González, et al., "Dependence Speculative Multithreaded Architecture", In Technical Report, Retrieved on: Jul. 1, 2015, 22 pages.
Govindan, "E3:Energy-Efficient EDGE Architectures", In Dissertation, Aug. 2010, 244 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hammond et al., "Programming with Transactional Coherence and Consistency (TCC)," ACM SIGOPS Operating Systems Review. vol. 38. No. 5. ACM, 2004, 13 pages.
Hammond et al., "Transactional Coherence and Consistency: Simplifying Parallel Hardware and Software," IEEE Computer Society, pp. 92-103, 2004.
Hammond et al., "Transactional Memory Coherence and Consistency," ACM SIGARCH Computer Architecture News. vol. 32. No. 2. IEEE Computer Society, 2004, 12 pages.

(56) References Cited

OTHER PUBLICATIONS

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Ipek et al., "Core Fusion: Accommodating Software Diversity in Chip Multiprocessors", In Proceedings of the 34th annual international symposium on Computer architecture, Jun. 9, 2007, 12 pages.
Kavi, et al., "Concurrency, Synchronization, Speculation—the Dataflow Way", In Journal of Advances in Computers, vol. 96, Nov. 23, 2013, pp. 1-41.
Kozumplik, et al., "TRIPS to the Semantic EDGE", Retrieved on: Sep. 22, 2015, Available at: http://vbn.aau.dk/ws/files/61072300/1212050422.pdf.
Liu, "Hardware Techniques to Improve Cache Efficiency", In Dissertation of the University of Texas at Austin, May 2009, 189 pages.
Maher, "Atomic Block Formation for Explicit Data Graph Execution Architectures", In Dissertation of Doctor of Philosophy, Aug. 2010, 185 pages.
Maher et al., "Merging Head and Tail Duplication for Convergent Hyperblock Formation," In Annual IEEE/ACM International Symposium on Microarchitecture, Dec. 2006, 12 pages.
McDonald et al., "Characterization of TCC on Chip-Multiprocessors," Parallel Architectures and Compilation Techniques, 2005. PACT 2005. 14th International Conference on. IEEE, 2005, 12 pages.
McDonald et al., "TRIPS Processor Reference Manual," In Technical Report TR-05-19, document marked Mar. 10, 2005, 194 pages.
Munshi, et al., "A Parameterizable Simd Stream Processor", In Proceedings of Canadian Conference on Electrical and Computer Engineering, May 1, 2005, pp. 806-811.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Nagarajan et al., "Static Placement, Dynamic Issue (SPDI) Scheduling for EDGE Architectures," In Proceedings of the 13th International Conference on Parallel Architecture and Compilation Techniques, Sep. 29, 2004, 11 pages.
Pengfei et al., "M5 Based EDGE Architecture Modeling", In Proceedings of IEEE International Conference on Computer Design, Oct. 3, 2010, pp. 289-296.
Pickett, "Software Method Level Speculation for Java", In Thesis, Apr., 2012, 236 pages.
Pierce et al., "Wrong-Path Instruction Prefetching", In Proceedings of the 29th Annual IEEE/ACM International Symposium on Microarchitecture, Dec. 2, 1996, pp. 1-17.
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.
Roesner, "Counting Dependence Predictors," In Undergraduate Honors Thesis, May 2, 2008, 25 pages.
Sankaralingam, "Polymorphous Architectures: A Unified Approach for Extracting Concurrency of Different Granularities", In Doctoral Dissertation of Philosophy, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Smith et al., "Dataflow Predication", In Proceedings of 39th Annual IEEE/ACM International Symposium on Microarchitecture, Dec. 9, 2006, 12 pages.
Souza et al., "Dynamically Scheduling VLIW Instructions", In Journal of Parallel and Distributed Computing, vol. 60, Jul. 2000, pp. 1480-1511.
Wu et al., "Block Based Fetch Engine for Superscalar Processors", In Proceedings of the 15th International Conference on Computer Applications in Industry and Engineering, Nov. 7, 2002, 4 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
International Search Report and Written Opinion issued by European Patent Office dated Sep. 22, 2016, for PCT/US2016/038853, 16pp.
International Search Report and Written Opinion issued by European Patent Office dated Sep. 22, 2016, for PCT/US2016/038854, 14pp.
International Search Report and Written Opinion issued by European Patent Office dated Sep. 27, 2016, for PCT/US2016/038855, 14pp.
International Search Report and Written Opinion issued by European Patent Office dated Sep. 30, 2016, for PCT/US2016/038845, 15pp.
International Search Report and Written Opinion issued by European Patent Office dated Oct. 5, 2016, for PCT/US2016/038848, 11pp.
Pricopi and Mitra, "Bahurupi: A Polymorphic Heterogeneous Multi-Core Architecture", *ACM Transactions on Architecture and Code Optimization*, vol. 8, No. 4, Article 22, Jan. 2012, 21pp.
Robatmili et al., "Strategies for Mapping Dataflow Blocks to Disributed Hardware," In *41st IEEE/ACM International Symposium on IEEE*, Nov. 8, 2008, pp. 23-34.
International Preliminary Report on Patentability Issued in PCT Application No. PCT/US2016/038854 (dated Jun. 6, 2017), 8pp.
Appelbe et al., "Hoisting Branch Conditions—Improving Super-Scalar Processor Performance", College of Computer, School of Electrical and Computer Engineering George Institute of Technology, Atlanta, GA, pp. 304-317.
Office Action for U.S. Appl. No. 14/752,636, dated Apr. 14, 2017, 30pp.

\* cited by examiner

FIG. 8
REMAPPING
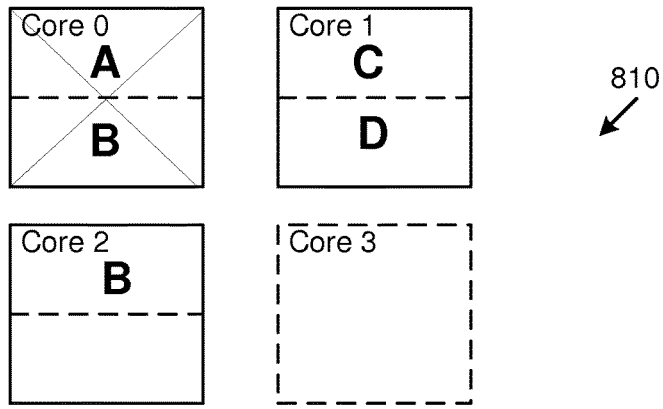
ALIGNING
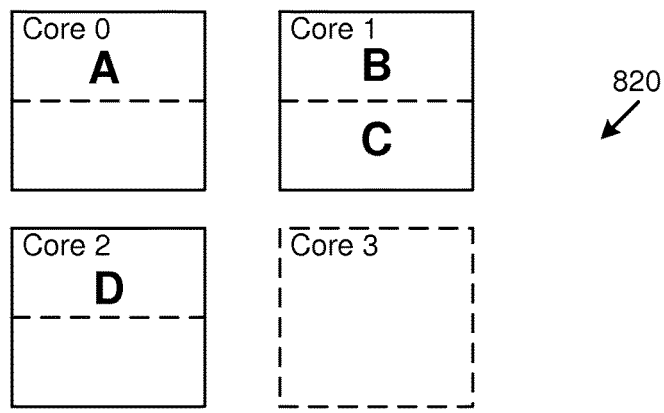
ALIGNING & UNROLLING
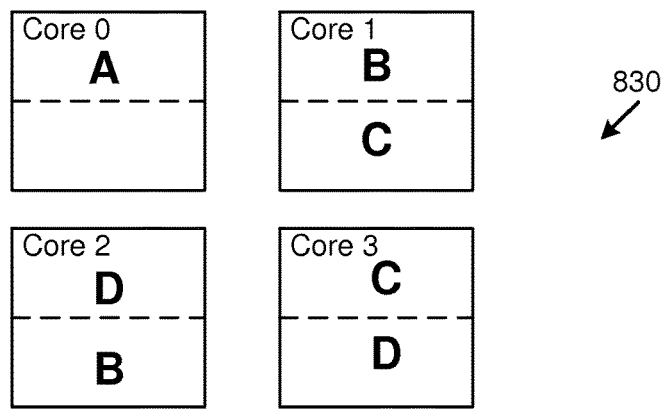

REUSE OF DECODED INSTRUCTIONS

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for reusing decoded instructions in block-based processor instruction set architecture (BB-ISA). The described techniques and tools can potentially improve processor performance and can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, touch screen tablet devices, tablet computers, wearable computers, and laptop computers.

In some examples of the disclosed technology, a system includes a plurality of block-based processor cores and an instruction scheduler. A respective core is capable of executing one or more instruction blocks of a program. The instruction scheduler can be configured to identify a given instruction block of the program that is resident on a first processor core of the processor cores and is to be executed again. The instruction scheduler can be configured to adjust a mapping of instruction blocks in flight so that the given instruction block is re-executed on the first processor core without re-fetching the given instruction block.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 8 is a diagram illustrating different mappings of instruction blocks to processor cores of a block-based processor, as can be used in some examples of the disclosed technology.

DETAILED DESCRIPTION

I. General Considerations

Figure 1:
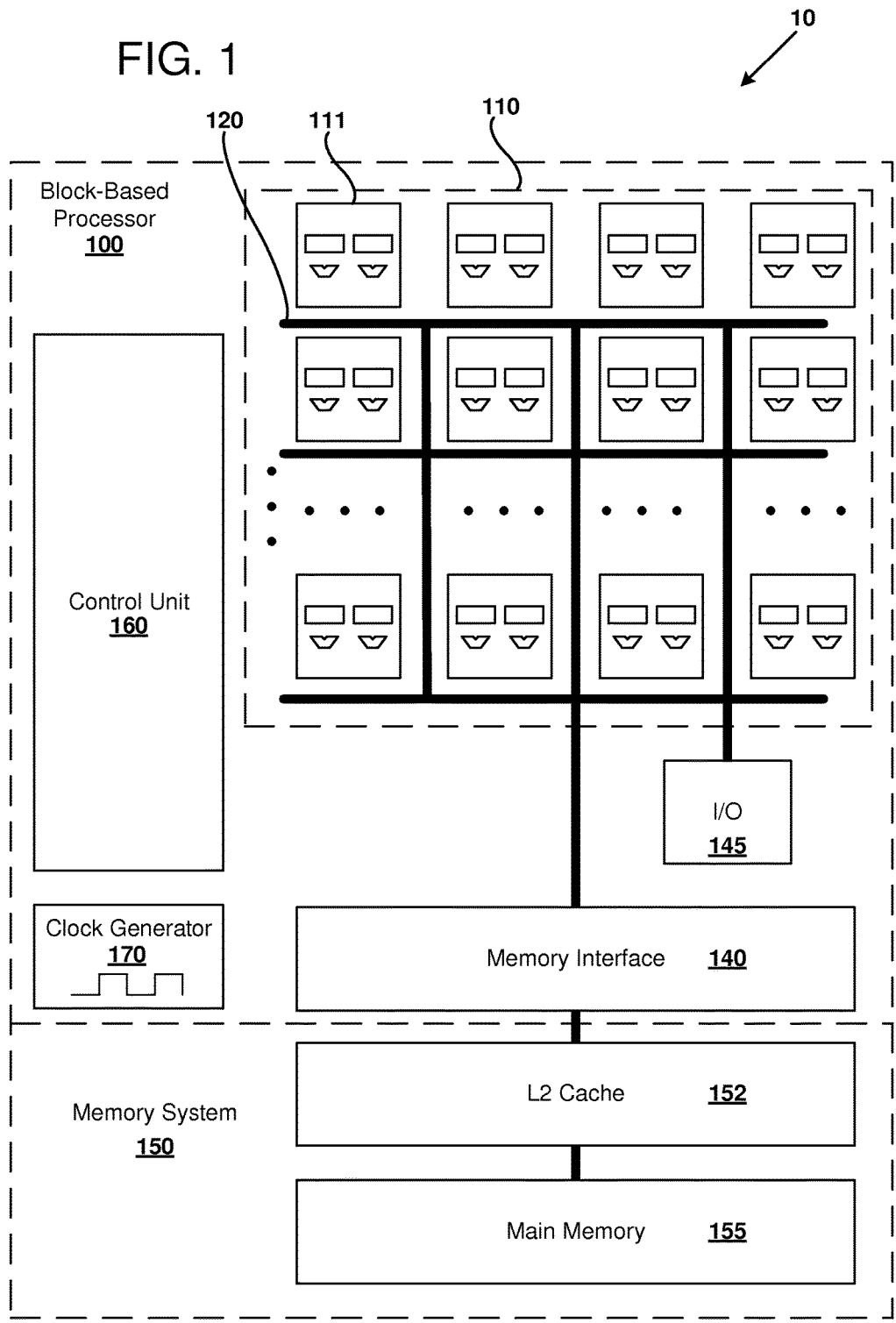
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit,"

"verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

As will be readily understood to one of ordinary skill in the relevant art, a spectrum of implementations of the disclosed technology are possible with various area, performance, and power tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler that is used to allocate instruction blocks to the processor cores 110. As used herein, scheduler allocation refers to hardware for directing operation of an instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
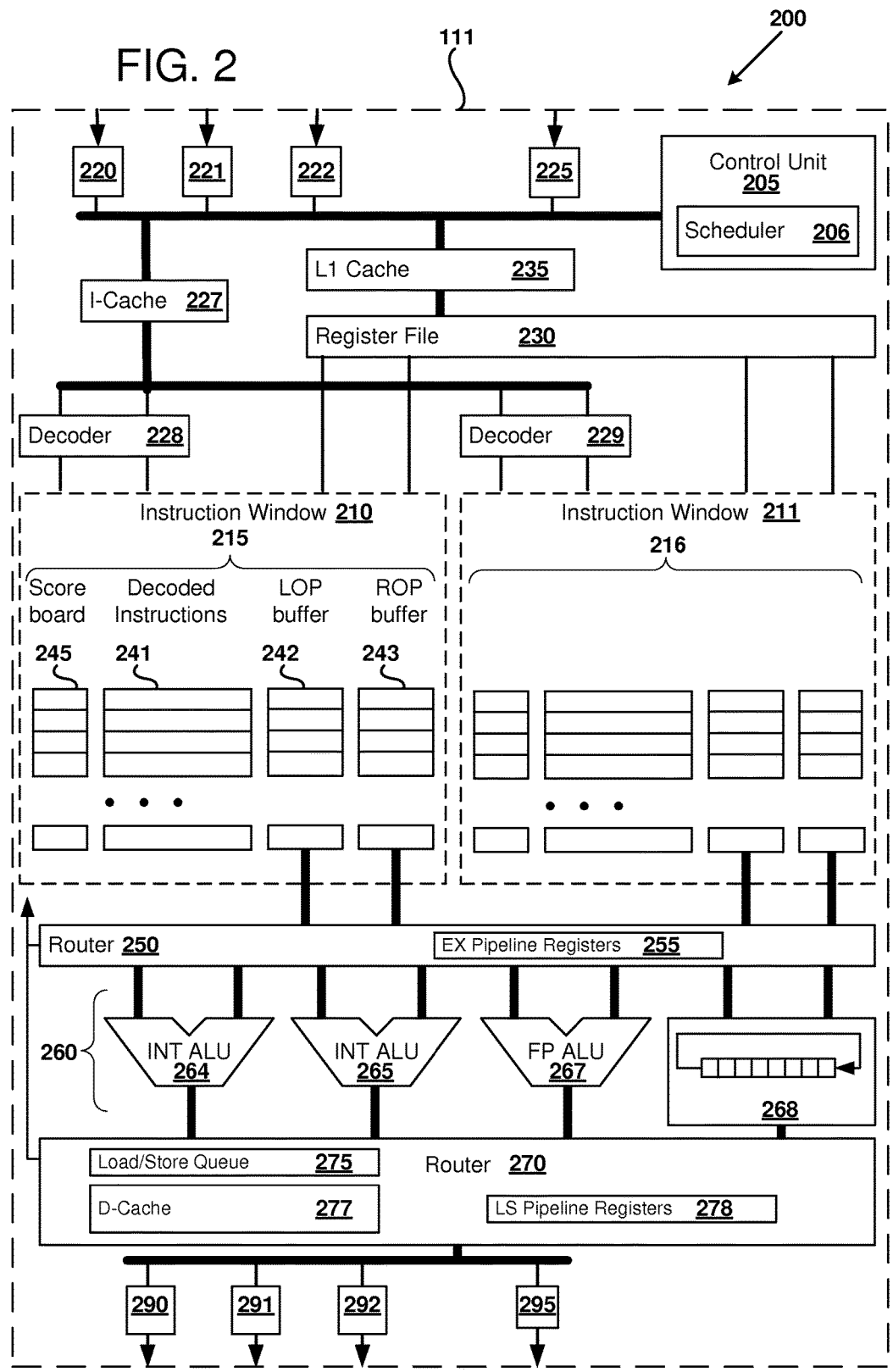
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The example processor core 111 includes two instruction windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instruction windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associated with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands are read from the operand buffers 242 and 243, not the register file.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). In one embodiment, the control unit can fetch and decode two instructions per clock cycle into each of the instruction windows 210 and 211. In alternative embodiments, the control unit can fetch and decode one, four, or another number of instructions per clock cycle into a corresponding number of instruction windows. The control unit 205 provides instruction window dataflow scheduling logic to monitor the ready state of each decoded instruction's inputs (e.g., each respective instruction's predicate(s) and operand(s) using the scoreboard 245. When all of the inputs for a particular decoded instruction are ready, the instruction is ready to issue. The control logic 205 then initiates execution of one or more next instruction(s) (e.g., the lowest numbered ready instruction) each cycle and its decoded instruction and input operands are sent to one or more of functional units 260 for execution. The decoded instruction can also encode a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction.

In one embodiment, the scoreboard 245 can include decoded ready state, which is initialized by the instruction decoder 231, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The decoded active state can encode whether a respective instruction awaits a predicate and/or some operand(s), is ready to issue, or has already issued. The decoded ready state can cleared on a block reset or a block refresh. Upon branching to a new instruction block, the decoded ready state and the decoded active state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core. In some examples, the instruction windows 210, 211 can be logically partitioned so that multiple instruction blocks can be executed on a single processor core. For example, one, two, four, or another number of instruction blocks can be executed on one core. The respective instruction blocks can be executed concurrently or sequentially with each other.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 250 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 can include a load/store queue 275, which can be used to issue memory instructions, a data cache 277, which stores data being output from the core to memory, and load/store pipeline register 278.

The core also includes control outputs 295 which are used to indicate, for example, when execution of all of the instructions for one or more of the instruction windows 215 or 216 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some examples, the instruction scheduler 206 is implemented using storage (e.g., first-in first-out (FIFO) queues, content addressable memories (CAMs)) storing data indicating information used to schedule execution of instruction blocks according to the disclosed technology. For example, data regarding instruction dependencies, transfers of control, speculation, branch prediction, and/or data loads and stores are arranged in storage to facilitate determinations in mapping instruction blocks to processor cores. For example, instruction block dependencies can be associated with a tag that is stored in a FIFO or CAM and later accessed by selection logic used to map instruction blocks to one or more processor cores. In some examples, the instruction scheduler 206 is implemented using a general purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

In some cases, the scheduler 206 accepts events for target instructions that have not yet been decoded and must also inhibit reissue of issued ready instructions. Instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

V. Example Stream of Instruction Blocks

Figure 3:
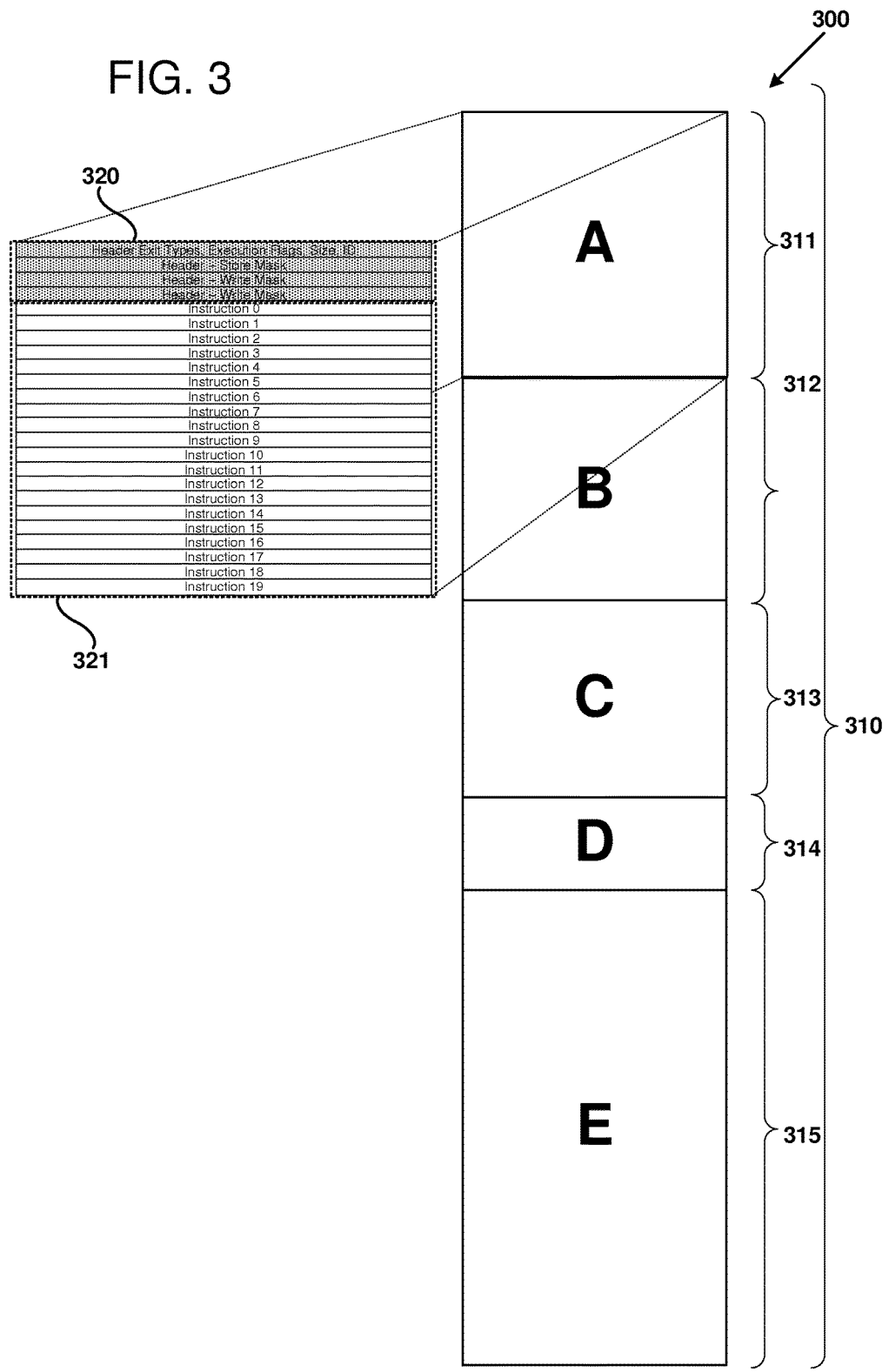
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-315 (A-E) is illustrated. The stream of instructions can be used to implement user application, system services, or any other suitable use. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

VI. Example Block Instruction Target Encoding

Figure 4:
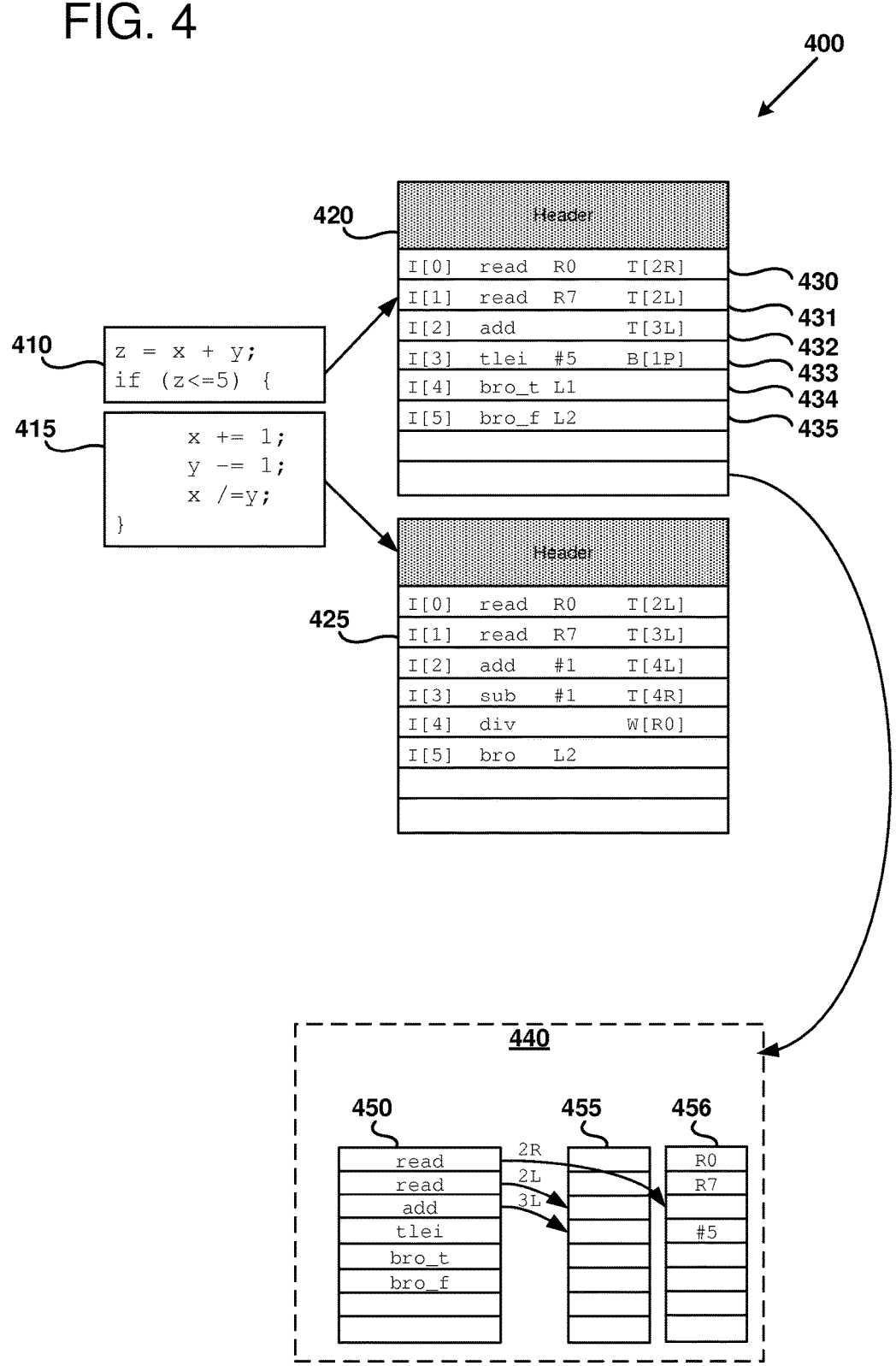
FIG. 4 illustrates portions of source code and respective instruction blocks.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In this example, the first two READ instructions 430 and 431 target the right (T[2R]) and left (T[2L]) operands, respectively, of the ADD instruction 432. In the illustrated ISA, the read instruction is the only instruction that reads from the global register file (e.g., register file 160); however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

As a comparison, a conventional out-of-order RISC or CISC processor would dynamically build the dependence graph at runtime, using additional hardware complexity, power, area and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

Figure 5:
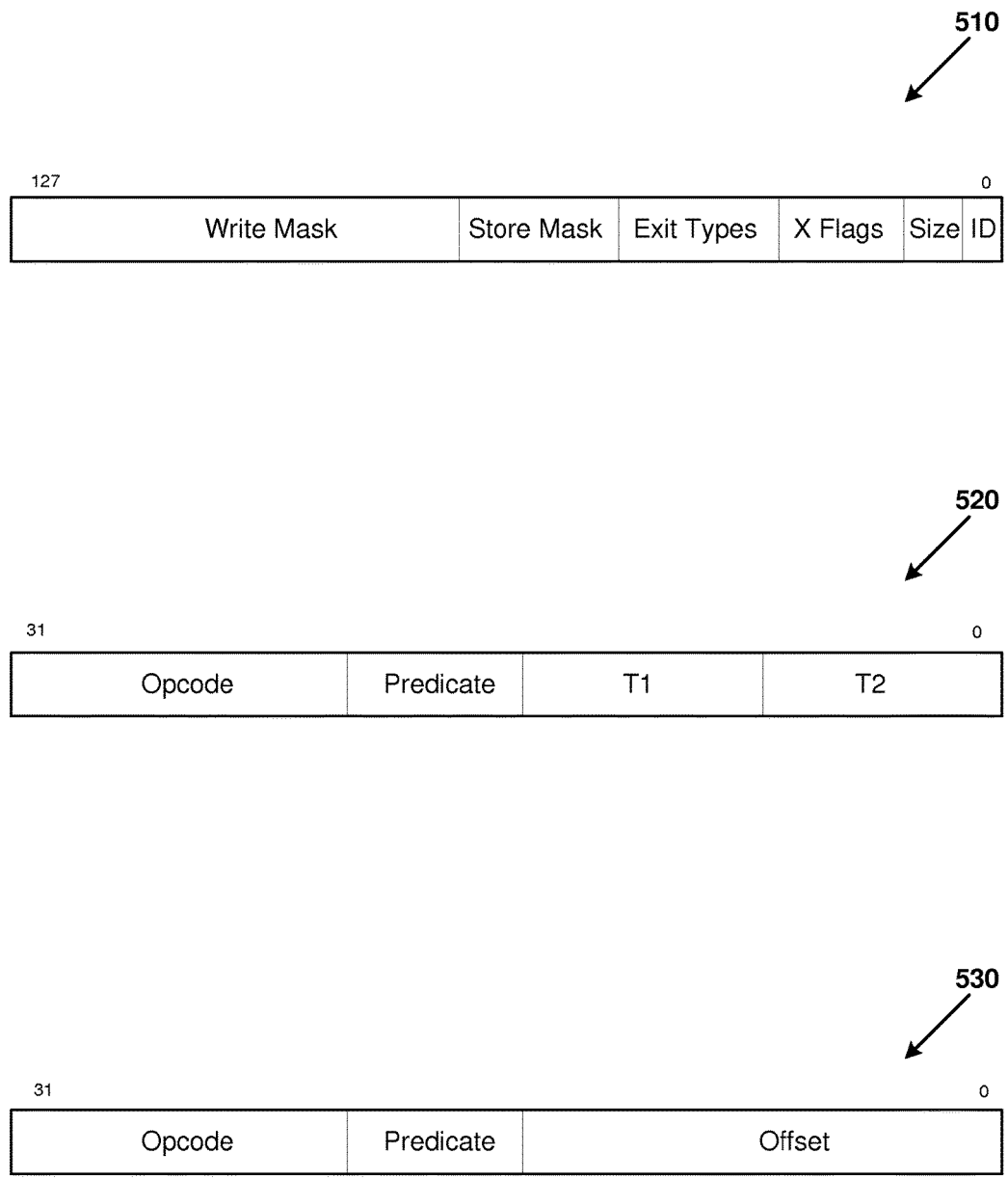
FIG. 5 illustrates block-based processor headers and instructions, as can be used in some examples of the disclosed technology.

FIG. 5 is a diagram illustrating generalized examples of instruction formats for an instruction header 510, a generic instruction 520, and a branch instruction 530. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field, a number of exit type fields, a number of execution flag fields, an instruction block size field, and an instruction header ID bit (the least significant bit of the instruction header).

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. A broadcast identifier can be encoded in the generic block instruction 520.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10. Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

VIII. Example States of a Processor Core

Figure 6:
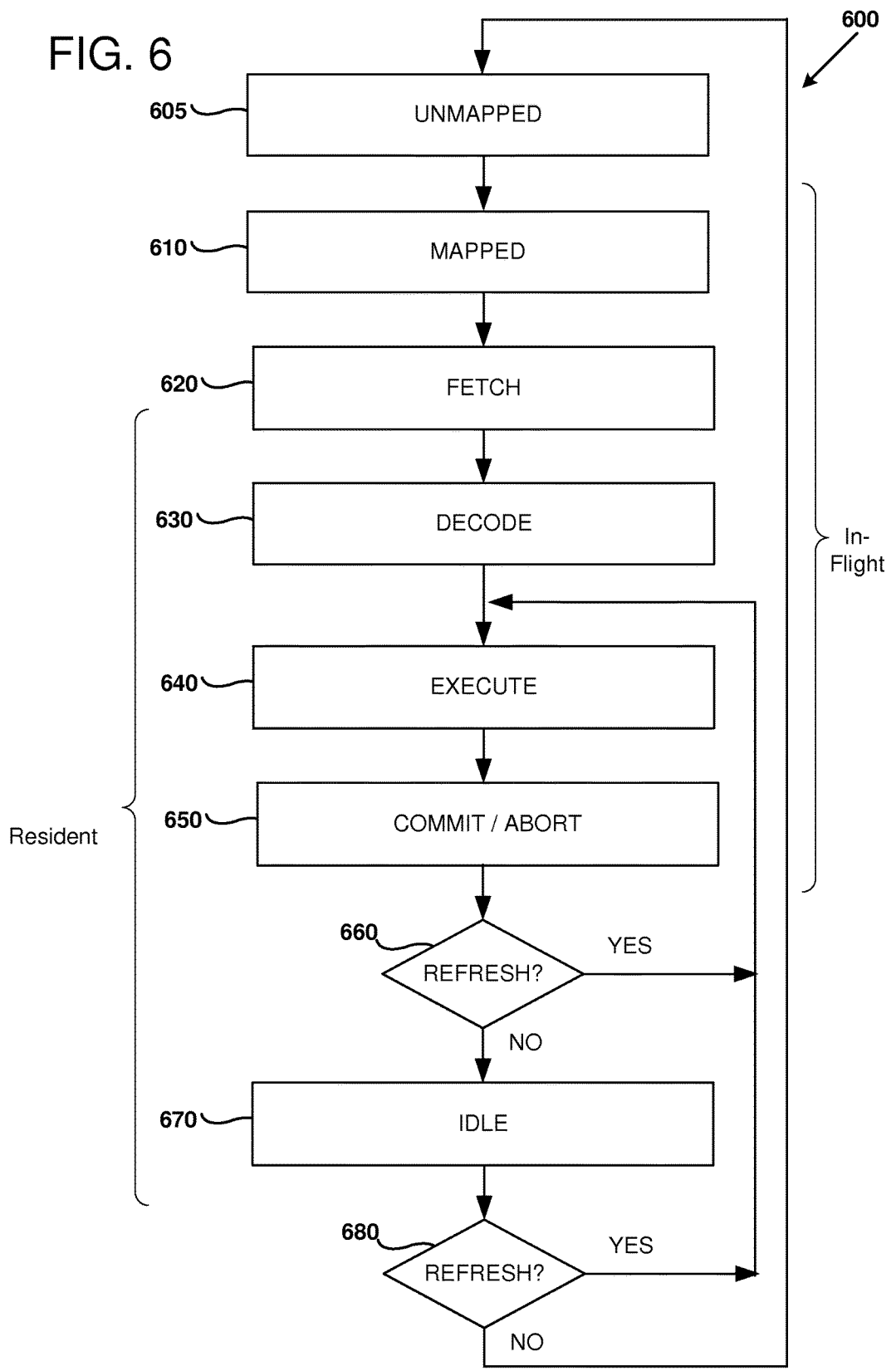
FIG. 6 is a flowchart illustrating an example of a progression of states of a processor core of a block-based processor.

FIG. 6 is a flowchart illustrating an example of a progression of states 600 of a processor core of a block-based computer. The block-based computer is composed of multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program. Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At 610, the state of the respective processor core can be mapped. A mapped processor core is a core that is currently assigned to execute an instance of an instruction block. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At 620, the state of the respective processor core can be fetch. For example, the IF pipeline stage of the processor core can be active during the fetch state. An instruction block that is being fetched is a block that is being transferred from memory (such as the L1 cache, the L2 cache, or main memory) to the processor core. For example, the instructions of the instruction block can be loaded into a buffer or registers of the processor core. The fetch state can be multiple cycles long and can overlap with the decode (630) and execute (640) states when the processor core is pipelined. When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At 640, the state of the respective processor core can be execute. During the execute state, instructions of the instruction block are being executed. In particular, the EX and/or LS pipeline stages of the processor core can be active during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

At 650, the state of the respective processor core can be commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

At 660, it can be determined if the instruction block resident on the processor core can be refreshed. As used herein, an instruction block refresh or a processor core refresh means enabling the processor core to re-execute one or more instruction blocks that are resident on the processor core. In one embodiment, refreshing a core can include resetting the active-ready state for one or more instruction blocks. It may be desirable to re-execute the instruction block on the same processor core when the instruction block is part of a loop or a repeated sub-routine or when a speculative block was terminated and is to be re-executed. The decision to refresh can be made by the processor core itself (contiguous reuse) or by outside of the processor core (non-contiguous reuse). For example, the decision to refresh can come from another processor core or a control core performing instruction block scheduling. There can be a potential energy savings when an instruction block is refreshed on a core that already executed the instruction as opposed to executing the instruction block on a different core. Energy is used to fetch and decode the instructions of the instruction block, but a refreshed block can save most of the energy used in the fetch and decode states by bypassing these states. In particular, a refreshed block can re-start at the execute state (640) because the instructions have already been fetched and decoded by the core. When a block is refreshed, the decoded instructions and the decoded ready state can be maintained while the active ready state is cleared. The decision to refresh an instruction block can occur as part of the commit operations or at a later time. If an instruction block is not refreshed, the processor core can be idled.

At 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative misprediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Examples of a Block-Based Processor During Execution

Figure 7:
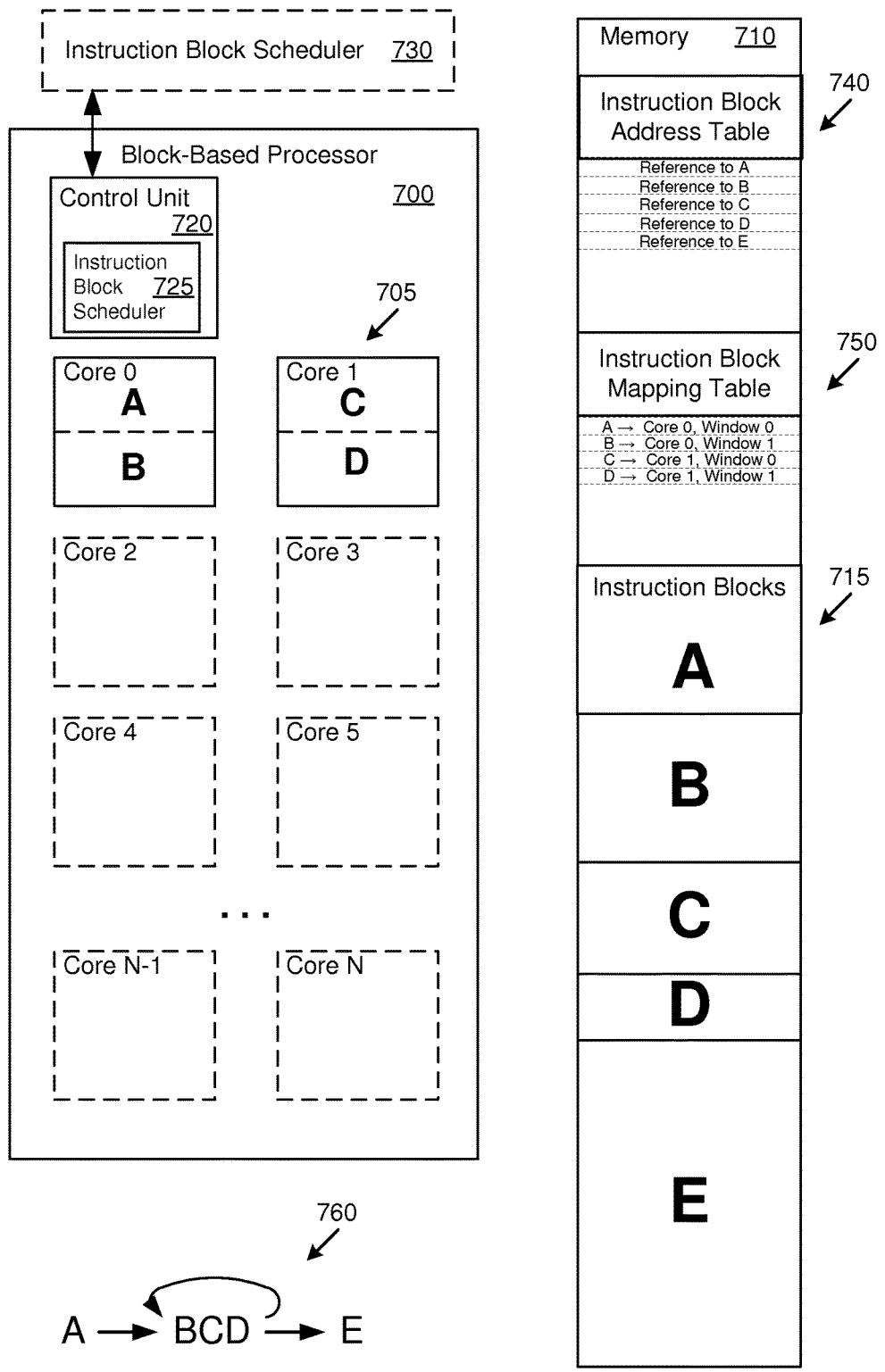
FIG. 7 is a diagram illustrating a block-based processor and memory, as can be used in some examples of the disclosed technology.

FIG. 7 is a diagram illustrating an example of a block-based processor 700 and memory 710. The block-based processor 700 can include a plurality of homogeneous or heterogeneous processor cores 705 (e.g., Core 0-Core N) for executing instruction blocks 715 (e.g., instruction blocks A-E) that are stored in memory 710. The block-based processor 700 can include a control unit 720 having an instruction block scheduler 725 for scheduling the instruction blocks 715 on the processor cores 705. In some embodiments, the control unit 720 can be implemented at least in part using one or more of: hardwired finite state machines, programmable microcode, programmable gate arrays, or other suitable control circuits. In one embodiment, the control unit 720 can be one of the processor cores 705 running an instruction block that performs control functions of the block-based processor 700, such as instruction block scheduling. In another embodiment, an external instruction block scheduler 730 (e.g., an on-chip or off-chip processor executing scheduling code) can be used to schedule the instruction blocks on the processor cores 705.

The memory 710 is readable and writeable by the block-based processor 700. The memory 710 can include embedded memory on the block-based processor 700, a level 1 (L1) cache, L2 cache, main memory, and secondary storage, for example. The memory 710 can include one or more programs comprising the instruction blocks 715 to be executed on the block-based processor 700, program data (not shown), and data structures for managing the hardware resources of the block-based processor 700. For example, the data structures stored in the memory 710 can include an instruction block address table 740 storing the starting locations to the instruction blocks, an instruction block mapping table 750 storing the mappings of instruction blocks to processor cores, an idle pool (not shown) of processors that are available to run instruction blocks, a reusable pool (not shown) of idle processor cores having resident instruction blocks, and other data structures. The instruction block scheduler 725 can reference and manipulate these data structures when determining which instruction blocks can be scheduled or allocated to which processor cores 705.

The instruction block scheduler 725 (or 730) can allocate the processor cores 705 so that one or more programs can be executed on the block-based processor 700. For example, the instruction block scheduler 725 can allocate instruction blocks of a program to one or more of the processor cores 705 that are idle. As a specific example, a short program can include the instruction blocks A-E. A program structure or dataflow diagram 760 of the program shows that the program begins with instruction block A, branches unconditionally to instruction block B, which branches unconditionally to instruction block C, which branches unconditionally to instruction block D, which can either loop back to instruction block B or branch to instruction block E. As shown in FIG. 7, the instruction block scheduler 725 has allocated two processor cores to execute the instruction blocks A-D. Specifically, processor core 0 is allocated for blocks A and B (blocks A and B are resident on core 0) and processor core 1 is allocated for blocks C and D (blocks C and D are resident on core 1). In this example, multiple instruction blocks can be scheduled to a given processor core. For example, a processor core may have storage for up to 128 decoded instructions which can be further divided into instruction block slots or instruction windows with storage for up to 32 decoded instructions. Thus, a given processor core may execute from one to four instruction blocks sequentially or concurrently. It may be desirable to pack the instruction blocks into fewer processor cores so that more instruction blocks can be loaded and executing on the block-based processor 700 at one time.

The instruction block scheduler 725 can allocate the processor cores 705 so that some or all repeated or recurring instruction blocks (such as the blocks BCD) remain resident on the processor cores over multiple iterations, and those processor cores can be refreshed so that the at least some of the instruction blocks are not re-fetched and re-decoded. Deciding whether an instruction block is part of a recurrence and whether its corresponding processor can be refreshed can be determined at compile-time or at run-time. In some cases, it can be known whether the branch from D to B will be taken based on a static analysis of the program code performed at compile-time. For example, the blocks BCD can be within a loop having a fixed number of iterations. In other cases, it can only be known whether the branch from D to B will be taken based on a dynamic analysis of the program code performed at run-time. For example, the blocks BCD can be within a section of code that may repeat depending on data that is calculated and/or input when the program is run. In other words, the branch target of block D may only be known after the branch target is calculated by core 1 during the execution of block D.

The compiler can detect that a recurrence of BCD may occur and the compiler can encode a hint to the instruction block scheduler 725 within one or more of the instruction block headers (such as in the header of instruction block B). For example, the compiler hint can include control flow information, such as a start of recurrence, whether the number of iterations is known, a fixed number of iterations, a prediction of whether the recurrence will occur, the number of instruction blocks in a recurrence, the ending block of the recurrence, and other information about the recurrence. Additionally or alternatively, the instruction block scheduler 725 and/or the processor cores 705 can dynamically analyze the program to supplement or supplant the information about the recurrence.

When a recurrence or potential recurrence is detected, the instruction block scheduler 725 can reserve one or more of the processor cores having the recurring instruction blocks resident. As a specific example, instruction block E can be allocated to core 2 instead of core 0. If block E were allocated to core 0, then decoded blocks A and B would be overwritten, and block B would need to be re-fetched and re-decoded on a different core if the branch from D to B were taken after block E was allocated to core 0. One example method of reserving a core can be accomplished by assigning a priority level to a core. Blocks to be scheduled that do not match any of the blocks currently resident on the cores can be assigned to cores with higher priority than cores with lower priority. A core with no resident instruction block can have the highest priority and a core having an instruction block with a high probability of recurrence can have the lowest priority. Another example method of reserving a core can be accomplished by maintaining a cache of instruction blocks resident on idle processor cores. The cached cores can be kept out of the pool for allocating new cores to instruction blocks, unless the instruction block to be scheduled matches the instruction block that is resident on the idle core. Instruction blocks that are likely to recur (and their corresponding cores) can be placed in the cache. When the cache is full, the replacement policy of the cache can be least recently used, random, least likely to recur, or another policy designed to increase reuse of the cores.

The instruction block scheduler 725 can use a variety of techniques to increase reuse of the processor cores when instruction blocks are repeated. The techniques used can be based on a variety of factors, such as when a recurrence is detected, capabilities of the processor cores, capabilities of the instruction block scheduler, alignment of the instruction blocks within the cores, a predicted number of iterations, and other factors. The techniques for increasing reuse of the resident instruction blocks on the processor cores can include: waiting for a recurring instruction block to complete before allocating the recurring instruction block to another processor core; delaying allocation of one or more speculative instruction blocks; skipping an instruction window of a processor core with a resident recurring instruction block; copying instruction block state within a processor core; sharing or referencing instruction block state within a processor core; remapping a portion of the recurring instruction blocks to one or more different processor cores; aligning recurring instruction blocks within the processor cores; and unrolling recurring instruction blocks within the processor cores. The techniques for increasing reuse of the resident instruction blocks on the processor cores can be combined so that multiple techniques can be used by the instruction block scheduler 725 and/or the processor cores 705.

The instruction block scheduler 725 can wait for an earlier instance of a recurring instruction block to complete rather than allocating a later instance of the recurring instruction block to another processor core. In other words, a later instance of a recurring instruction block can be scheduled to execute on the same processor that is currently executing an earlier instance of the instruction block. The processor can be refreshed when execution of the earlier instance of the block is complete. Thus, the later instance can run on the same processor as the earlier instance. As a specific example, if the scheduler 725 determines that block B is to be repeated before an earlier instance of block B is finished executing, the scheduler 725 can wait for the earlier instance of block B to complete before refreshing block B so that the later instance of block B can execute on the same processor that executed the earlier instance of block B.

The instruction block scheduler 725 can limit or delay allocation of one or more speculative instruction blocks so that resident instruction blocks can potentially be reused. For example, there are a fixed number of processor cores on a given block-based processor. Allocating a core to speculatively execute an instruction block may overwrite or evict an instruction block that can potentially be re-executed. As one example, the scheduler 725 can set a maximum limit on the number of blocks that are executing speculatively so that non-speculative resident instruction blocks may have a longer lifetime before being overwritten. As another example, the scheduler 725 can wait to allocate a speculative instruction block until it is known that the instruction block will be used. Allocation of all speculative instruction blocks can be delayed, or speculative instruction blocks with low probabilities of being taken can be delayed (such as by setting a threshold probability to be allocated).

The processor cores 705 can enable reuse by skipping an instruction window of a processor core with a resident recurring instruction block. As a specific example, block A can be allocated to core 0, window 0; block B can be allocated to core 0, window 1; block C can be allocated to core 1, window 0; block D can be allocated to core 1, window 1. As shown in the dataflow diagram 760, blocks BCD can be a recurrence so that the flow of execution is A, BCD, BCD . . . Core 0 includes a recurring block (block B) and a non-recurring block (block A). The cores 705 can be configured so that execution of the program can flow from an instance of block D executing on core 1 to an instance of block B executing on core 0. For example, window 1 can be refreshed while window 0 is not refreshed. Thus, the instruction window corresponding to the non-recurring block (block A) can be skipped.

The processor cores 705 can enable reuse by providing the capability to copy instruction block state within a processor core. As a specific example, block A can be initially allocated to core 0, window 0; block B can be initially allocated to core 0, window 1; block C can be initially allocated to core 1, window 0; block D can be initially allocated to core 1, window 1. In order to perform the second iteration of the BCD recurrence, the recurring block (block B) can be copied to window 0 which will overwrite the non-recurring block A. This may be desirable when the cores are configured to always begin execution at window 0, for example. The power savings may be less than if the recurring block were not copied, but the power savings is potentially greater than if the recurring block were fetched from memory and re-decoded.

The processor cores 705 can enable reuse by providing the capability to share or reference instruction block state within a processor core. For example, the decoded ready state and the decoded instructions of window 1 can be used with the active ready state of window 0. Thus, the recurring block B can appear to be located in window 0 without copying all of the state of block B from window 1 to window 0. This may be desirable when the cores are configured to always begin execution at window 0, for example.

FIG. 8 is a diagram illustrating examples of different mappings (810, 820, 830) of instruction blocks to processor cores using the same example program and dataflow diagram 760 as in FIG. 7. The instruction block scheduler 725 can adjust the number of blocks in flight and the mappings of the blocks to cores to potentially maximize refresh. The mapping 810 illustrates that one portion of the recurrence can be remapped while another portion of the recurrence can be refreshed. The mapping 820 illustrates that the scheduler 725 can initially allocate the blocks of the recurrence so that the recurrence begins or is aligned in window 0 of a first core. The mapping 830 illustrates that the scheduler 725 can align and unroll the blocks of the recurrence during allocation to potentially increase the utilization and/or performance of the cores.

The instruction block scheduler 725 can remap a portion of the recurring instruction blocks to one or more different processor cores, as shown by the example mapping 810. In particular, block A can be initially allocated to core 0, window 0; block B can be initially allocated to core 0, window 1; block C can be initially allocated to core 1, window 0; block D can be initially allocated to core 1, window 1. Block B can be remapped to core 2, window 0 for the second iteration of the recurrence BCD for a variety of reasons. For example, the recurrence BCD can be detected late in execution, such as when block D, executing on core 1, calculates its branch target back to B. When the recurrence is detected, core 0 may have already been overwritten with a different block (so that block B is no longer resident in core 0). While block B will be re-fetched and re-decoded on core 2, blocks C and D can be refreshed on core 1. As another example, the cores may be configured to always begin execution at window 0 and so the initial allocation of block B to core 0, window 1 is reallocated to core 2 so that the second iteration of BCD can begin at core 2, window 0. Here, the block B precedes the blocks CD for a given iteration of the recurrence. The block B can execute on core 0 during the first iteration of BCD, and block B can execute on core 2 during the following iterations of BCD. The blocks CD can execute on core 1 for all of the iterations of BCD.

The instruction block scheduler 725 can align recurring instruction blocks within the processor cores, as shown by the example mapping 820. For example, when the recurrence is known prior to the mapping of the block B, the scheduler 725 can align block B so that it is placed in the beginning window of a processor core. Specifically, B could have fit in core 0, window 1 but it was placed in core 1, window 0 so that the recurrence begins in window 0. Aligning blocks can potentially create "holes" at the end of a recurrence, where a hole refers to an unutilized window of a processor core. The holes can potentially be filled with an instruction block that is not part of the recurrence.

The holes at the end of a recurrence can potentially be filled by "unrolling" the recurrence, such as shown by the example mapping 830. As used herein, unrolling refers to allocating multiple blocks of the recurrence on multiple processor cores. For example, four iterations of the BCD loop can be executed in the following sequence: BC on core 1, DB on core 2, CD on core 3, BC on core 1, DB on core 2, and CD on core 3. Thus, the first iteration is executed on cores 1 and 2, the second iteration is executed on cores 2 and 3, the third iteration is executed on cores 1 and 2, and the fourth iteration is executed on cores 2 and 3. The loop has been unrolled such that two instances of each instruction block are allocated to the processor cores. Thus, unrolling can consume more resources than not unrolling, but it can result in better utilization of the resources by filling holes.

Using the techniques described above, the instruction block scheduler 725 can adjust the number of instruction blocks in-flight to potentially increase reuse of the resident instruction blocks so that dynamic power dissipation can be reduced and/or performance can be increased.

X. Example Methods of Reusing Decoded Instructions

Figure 9:
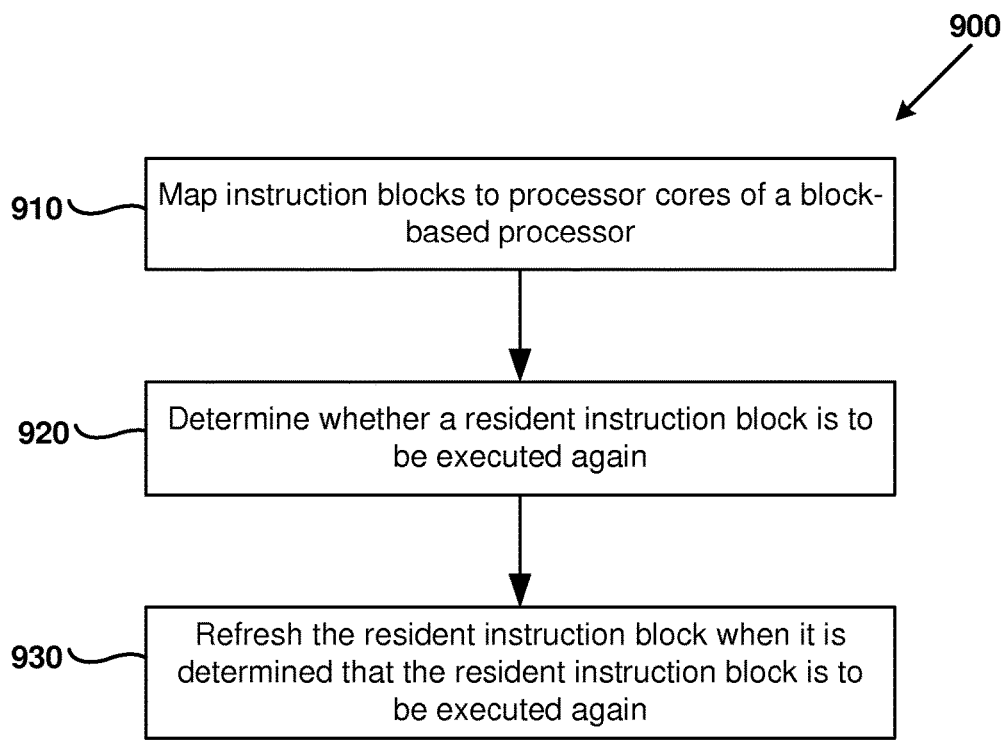
FIGS. 9-10 are flowcharts illustrating example methods of reusing decoded instructions, as can be performed in some examples of the disclosed technology.

FIG. 9 is a flowchart illustrating an example of a method 900 of reusing fetched and decoded instructions. At 910, instruction blocks can be mapped to processor cores of a block-based processor. For example, an instruction block scheduler running within or external to the block-based processor can allocate the processor cores to execute (speculatively or non-speculatively) the instruction blocks of one or more programs. Multiple blocks can be mapped to a single core based on the size of the blocks, the capabilities of the cores (e.g., the number of instruction windows), and alignment considerations. Different instances of the same instruction block can be mapped to different processor cores, such as when unrolling a loop. Mapping can include aligning blocks to a particular instruction window, unrolling repeated instruction blocks, and reserving or caching resident blocks on idle cores, for example.

At 920, it is determined whether an instruction block resident on a processor core is to be executed again. The instruction block may be the only block resident on the processor core or there may also be other blocks resident on the core. The determination that the block is to be executed again can occur at various times, such as when the block is allocated (such as through a compiler hint), when the block is executing, or when the block is idle. The determination can be made by the processor core itself, by the instruction block scheduler, and/or by another processor core. The instruction block can be executed again because it is part of a recurrence (e.g., within a loop or a sub-routine) or because the block was mis-predicted (e.g., the block was speculatively executed and terminated before being committed) and is later executed non-speculatively, for example.

At 930, the resident instruction block is refreshed when it is determined that the resident instruction block is to be executed again. For example, the active-ready state corresponding to the instruction block can be reset. Other blocks resident on the processor core can be skipped, such as by not resetting the corresponding active-ready state, if those blocks are not to be executed again. By refreshing the block, the time and energy that would be used to re-fetch and re-decode the block can be saved as compared to loading the instruction block onto a different core.

Figure 10:
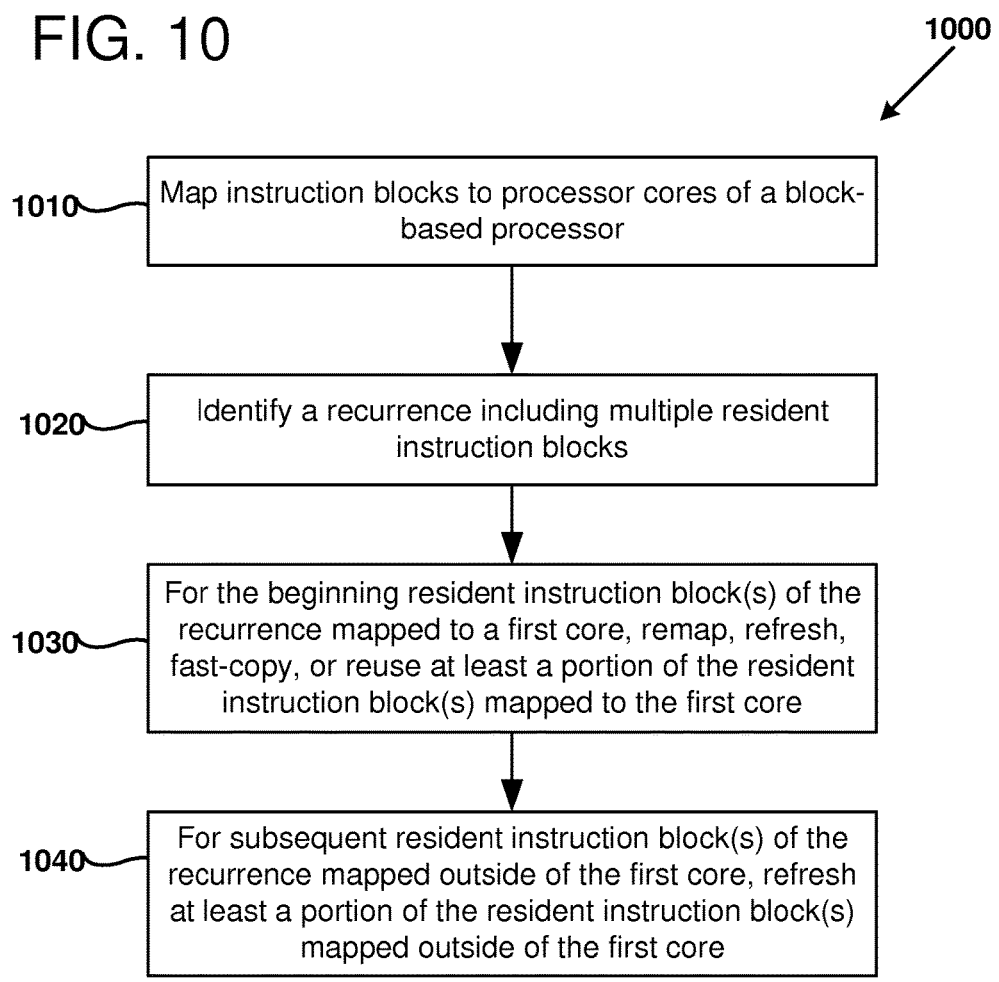

FIG. 10 is a flowchart illustrating another example of a method 1000 of reusing decoded instructions. At 1010, instruction blocks can be mapped to processor cores of a block-based processor, such as described with reference to 910.

At 1020, a recurrence including multiple resident instruction blocks can be identified. The recurrence can be the body of a for or a while loop, a subroutine or function, or other repeated code, for example. The instruction blocks of the recurrence can be mapped to multiple processor cores. The recurrence can be identified at compile time by the compiler, by the instruction block scheduler prior to an initial mapping, by the instruction block scheduler after the initial mapping, and/or by a processor core executing an instruction block. For example, the compiler can encode a compiler hint in a header of the beginning instruction block of the recurrence and the instruction block scheduler can decode the compiler hint to identify the recurrence. As another example, a processor executing an instruction block can calculate a branch target of the block, and the scheduler can identify that the branch target is to a resident instruction block.

At 1030, for the beginning resident instruction block(s) of the recurrence mapped to a first core, at least a portion of the beginning resident instruction block(s) can be remapped, refreshed, fast-copied, or reused. As a specific example, the block B in the examples of FIGS. 7 and 8 can be the beginning instruction block(s) of the recurrence. The beginning of the recurrence can be remapped to a different processor core when it is desired to have the recurrence begin at a starting instruction window, for example. The mapping 810 is a specific example of remapping. The beginning of the recurrence can be refreshed. The beginning of the recurrence can be aligned to window 0 of the first core so that the instruction blocks of the recurrence are the only blocks resident on the first core. Alternatively, the beginning of the recurrence can start at a non-zero window (it is misaligned), so that instruction blocks outside of the recurrence are also resident on the first core. When the beginning of the recurrence is misaligned, the instruction blocks of the beginning of the recurrence can be refreshed and instruction blocks outside of the recurrence can be left in their current state (so that they can be skipped during the next iteration of the recurrence). The beginning of the recurrence can be fast-copied within the first core, from a non-zero window to window 0, for example. Alternatively, the decoded state of a non-zero window can be shared with window 0 using a pointer or other reference.

At 1040, for subsequent resident instruction block(s) of the recurrence mapped outside of the first core, at least a portion of the resident instruction block(s) mapped outside of the first core can be refreshed. As an example, the block D in the examples of FIGS. 7 and 8 can be one of the subsequent instruction block(s) of the recurrence. In particular, blocks C and D can be refreshed given the mapping in 810. Block D can be refreshed given the mapping in 820.

XI. Example Computing Environment

Figure 11:
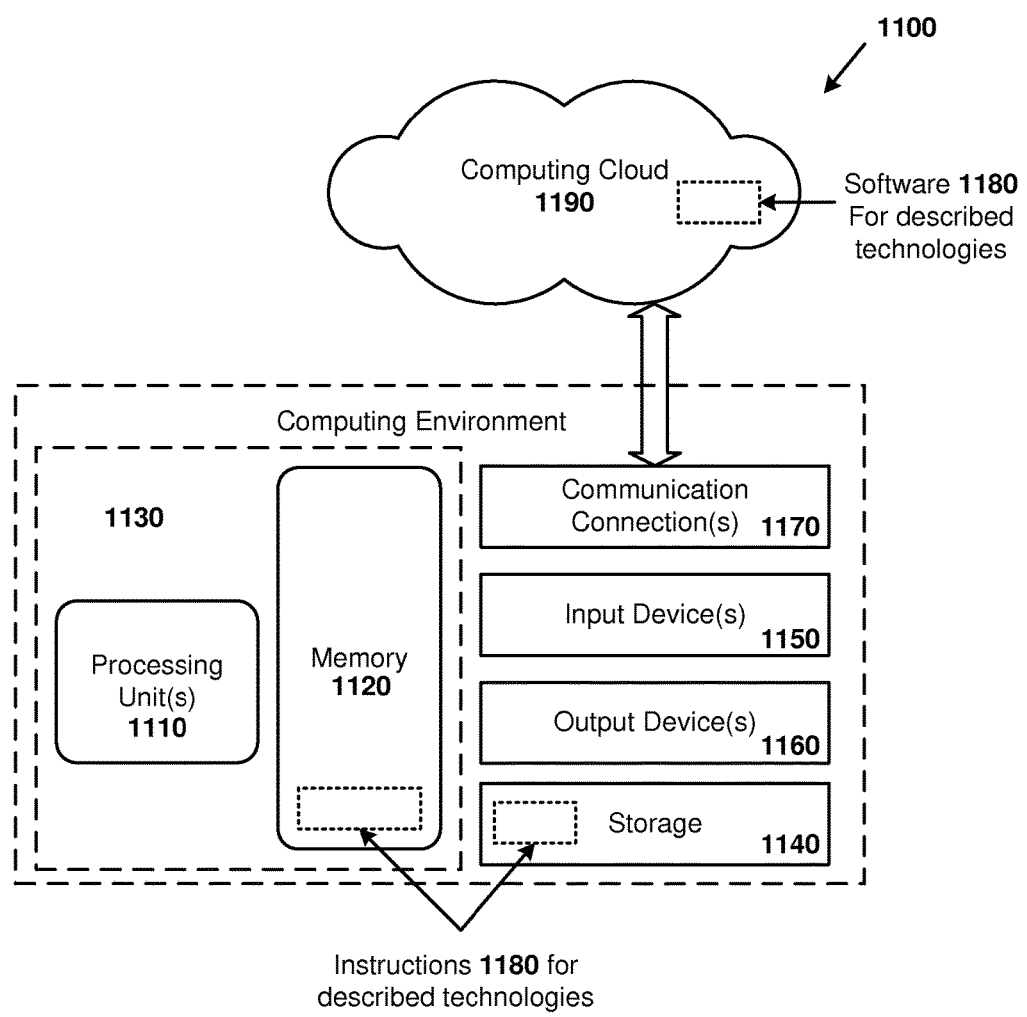
FIG. 11 is a block diagram illustrating a suitable computing environment for implementing some embodiments of the disclosed technology.

FIG. 11 illustrates a generalized example of a suitable computing environment 1100 in which described embodiments, techniques, and technologies, including bad jump detection in a block-based processor, can be implemented. For example, the computing environment 1100 can implement disclosed techniques for verifying branch instruction target locations, as described herein.

The computing environment 1100 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 11, the computing environment 1100 includes at least one block-based processing unit 1110 and memory 1120. In FIG. 11, this most basic configuration 1130 is included within a dashed line. The block-based processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180, images, and video that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other medium which can be used to store information and that can be accessed within the computing environment 1100. The storage 1140 stores instructions for the software 1180, plugin data, and messages, which can be used to implement technologies described herein.

The input device(s) 1150 may be a touch input device, such as a keyboard, keypad, mouse, touch screen display, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, video, or other data in a modulated data signal. The communication connection(s) 1170 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1190. For example, disclosed compilers and/or block-based-processor servers are located in the computing environment 1130, or the disclosed compilers can be executed on servers located in the computing cloud 1190. In some examples, the disclosed compilers execute on traditional central processing units (e.g., RISC or CISC processors).

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes the media for data storage such as memory 1120 and storage 1140, and not transmission media such as modulated data signals.

X. Additional Examples of the Disclosed Technology

Additional examples of the disclosed subject matter are discussed herein in accordance with the examples discussed above.

In one embodiment, a system comprises a plurality of block-based processor cores and an instruction block scheduler. Each respective one of the cores is capable of executing one or more instruction blocks of a program. The instruction block scheduler is configured to identify a given instruction block that is resident on a first processor core of the processor cores and is to be executed again; and adjust a mapping of instruction blocks in flight so that the given instruction block is re-executed on the first processor core without re-fetching the given instruction block. Adjusting the mapping of instruction blocks in flight may include skipping an instruction window of the first processor core. Adjusting the mapping of instruction blocks in flight may include remapping an earlier instruction block that is to be executed before the given instruction block. Adjusting the mapping of instruction blocks in flight may include delaying allocation of one or more speculative instruction blocks. Adjusting the mapping of instruction blocks in flight may include maintaining a cache of instruction blocks resident on idle processor cores. Adjusting the mapping of instruction blocks in flight may include waiting for the given instruction block to complete before refreshing the given instruction block on the first processor core. The instruction block scheduler may be further configured to decode a header of the instruction block, where the header may be encoded with control flow information. The identifying the given instruction block that is resident on the first processor core of the processor cores and is to be executed again may comprise identifying a loop of instruction blocks.

In one embodiment, a method of providing reuse in a block-based computer system comprises identifying a recurrence comprising multiple instruction blocks; and refreshing at least one of the instruction blocks of the recurrence so that the at least one of the instruction blocks is not re-fetched during at least one iteration of the recurrence. A first instruction block of the recurrence may be mapped to a first core of the block-based processor. A second instruction block of the recurrence may be mapped to a different second core of the block-based processor. The second instruction block of the recurrence may be refreshed. A third instruction block resident on the first instruction core may be skipped during the at least one iteration of the recurrence. The first instruction block of the recurrence may be remapped to a third core of the block-based processor for the at least one iteration of the recurrence. Decoded state information of the first instruction block of the recurrence may be copied within the first core of the block-based processor for the at least one iteration of the recurrence. Identifying the recurrence may comprise decoding a header of the instruction block to receive a compiler hint.

In one embodiment, one or more computer-readable storage media store computer-executable instructions for a block-based processor comprising multiple processor cores. The instructions comprise instructions to cause the block-based processor to allocate instruction blocks to the processor cores for execution. The instructions comprise instructions to cause the block-based processor to determine whether a first instruction block to be executed on the processor cores is resident in a first processor core of the processor cores. The instructions comprise instructions to cause the block-based processor to refresh the first instruction block on the first processor core based on a result of an instruction executing on a second processor core of the processor cores, where the second processor core is different from the first processor core. Allocating instruction blocks to the processor cores for execution may comprise allocating instruction blocks to execute speculatively and non-speculatively. The instructions may comprise instructions to cause the block-based processor to track instruction blocks that are resident on idle processor cores. The second processor core may be a control unit of the block-based computer system. The first processor core and the second processor core may both be in a pool of processor cores available for executing instruction blocks. The instructions may comprise instructions to cause the block-based processor to remap a second instruction block to a different processor core, where the first and second instruction blocks are within a recurrence, and the second instruction block precedes execution of the first instruction block.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:
1. A system comprising:
a plurality of block-based processor cores, wherein each respective one of the cores is capable of executing one or more instruction blocks of a program; and an instruction block scheduler configured to:
  identify a given instruction block that is resident on a first processor core of the processor cores and is to be executed again; and
  adjust a mapping of in-flight instruction blocks to multiple processor cores of the plurality of the processor cores so that the given instruction block is re-executed on the first processor core without re-fetching the given instruction block.

2. The system of claim 1, wherein the adjusting the mapping of the in-flight instruction blocks includes skipping an instruction window of the first processor core.

3. The system of claim 1, wherein the adjusting the mapping of the in-flight instruction blocks includes remapping an earlier instruction block that is to be executed before the given instruction block.

4. The system of claim 1, wherein the adjusting the mapping of the in-flight instruction blocks includes delaying allocation of one or more speculative instruction blocks.

5. The system of claim 1, wherein the adjusting the mapping of the in-flight instruction blocks includes maintaining a cache of instruction blocks resident on idle processor cores.

6. The system of claim 1, wherein the adjusting the mapping of the in-flight instruction blocks includes waiting for the given instruction block to complete before refreshing the given instruction block on the first processor core.

7. The system of claim 1, wherein the instruction block scheduler is further configured to decode a header of the given instruction block, the header encoded with control flow information.

8. The system of claim 1, wherein the identifying the given instruction block that is resident on the first processor core of the processor cores and is to be executed again comprises identifying a loop of instruction blocks.

9. A method of providing reuse in a block-based computer system, the method comprising:
  identifying a recurrence comprising a first instruction block and a second instruction block;
  mapping the first instruction block of the recurrence to a first core of the block-based processor and the second instruction block of the recurrence to a different, second core of the block-based processor, the first core and the second core each capable of executing a different respective instruction block; and
  remapping the first instruction block of the recurrence to a different third core of the block-based processor while refreshing the second instruction block of the recurrence so that the second instruction block is not re-fetched during at least one iteration of the recurrence.

10. The method of claim 9, wherein a third instruction block resident on the first instruction core is skipped during the at least one iteration of the recurrence.

11. The method of claim 9, wherein the first instruction block of the recurrence is remapped to a third core of the block-based processor for the at least one iteration of the recurrence.

12. The method of claim 9, wherein decoded state information of the first instruction block of the recurrence is copied within the first core of the block-based processor for the at least one iteration of the recurrence.

13. The method of claim 9, wherein identifying the recurrence comprises decoding a header of the first instruction block to receive a compiler hint.

14. One or more computer-readable storage media storing computer-executable instructions for a block-based processor comprising multiple processor cores, the instructions comprising:
  instructions to cause the block-based processor to allocate instruction blocks to the processor cores for execution;
  instructions to cause the block-based processor to determine residency of the allocated instruction blocks among the processor cores; and
  instructions to cause the block-based processor to adjust a mapping of the instruction blocks among the processor cores, the adjusting including refreshing a first instruction block on a first processor core based on a result of an instruction executing on a second processor core of the processor cores, the second processor core different from the first processor core.

15. The computer-readable storage media of claim 14, wherein allocating instruction blocks to the processor cores for execution comprises allocating instruction blocks to execute speculatively and non-speculatively.

16. The computer-readable storage media of claim 14, the instructions further comprising:
  instructions to cause the block-based processor to track instruction blocks that are resident on idle processor cores.

17. The computer-readable storage media of claim 14, wherein the second processor core is a control unit of the block-based computer system.

18. The computer-readable storage media of claim 14, wherein the first processor core and the second processor core are both in a pool of processor cores available for executing instruction blocks.

19. The computer-readable storage media of claim 14, wherein adjusting the mapping of the instruction blocks among the processor cores further comprises:
  remapping a second instruction block to a different processor core, wherein both the first instruction block and the second instruction block are within a recurrence, the second instruction block preceding execution of the first instruction block.

20. A system comprising:
  a plurality of block-based processor cores, wherein each respective one of the cores is capable of executing one or more instruction blocks of a program; and
  an instruction block scheduler configured to:
    identify a given instruction block that is resident on a first processor core of the processor cores and is to be executed again; and
    adjust a mapping of instruction blocks in flight so that the given instruction block is re-executed on the first processor core without re-fetching the given instruction block, wherein the adjusting the mapping of instruction blocks includes delaying allocation of one or more speculative instruction blocks.

21. The system of claim 20, wherein the instruction block scheduler is further configured to decode a header of the given instruction block, the header encoded with control flow information.

22. The system of claim 20, wherein the identifying the given instruction block that is resident on the first processor core of the processor cores and is to be executed again comprises identifying a loop of instruction blocks.

* * * * *